United States Patent [19]

Roberge et al.

[11] Patent Number: 4,621,198
[45] Date of Patent: Nov. 4, 1986

[54] METHOD AND SYSTEM FOR INTERCONNECTING TWO SYNCHRONOUS OR ASYNCHRONOUS ELECTRICAL ALTERNATING THREE-PHASE NETWORKS BY MEANS OF VARIABLE REACTIVE IMPEDANCES

[75] Inventors: Gérald Roberge, Repentigny; Momcilo Gavrilovic, Westmount; Pierre Pelletier, Boucherville, all of Canada

[73] Assignee: Hydro-Quebec, Montreal, Canada

[21] Appl. No.: 613,221

[22] Filed: May 23, 1984

[30] Foreign Application Priority Data

Jun. 14, 1983 [CA] Canada ................................. 430314

[51] Int. Cl.$^4$ ........................... H02J 3/34; H02J 3/18
[52] U.S. Cl. ......................................... 307/82; 307/87; 323/211
[58] Field of Search ............... 307/20, 52, 82, 85–87, 307/72–74, 75; 323/207–211, 217, 218; 363/149, 156, 160

[56] References Cited

U.S. PATENT DOCUMENTS

| | | |
|---|---|---|
| 732,204 | 6/1903 | Lunt . |
| 1,917,921 | 7/1933 | Burton . |
| 2,218,383 | 10/1940 | Herskind ........................... 172/281 |
| 2,309,586 | 1/1943 | Haines ............................... 172/281 |
| 2,395,389 | 2/1946 | Huge .................................. 172/281 |
| 2,896,090 | 7/1959 | Feder ................................. 307/88 |
| 3,211,914 | 10/1965 | Anderson ........................... 307/3 |
| 3,275,838 | 9/1966 | Almstrom ........................... 307/82 |
| 3,992,661 | 11/1976 | Kelley, Jr. et al. .................. 323/210 |
| 4,020,440 | 4/1977 | Moerman ............................ 336/155 |
| 4,028,614 | 6/1977 | Kelley, Jr. et al. .................. 323/210 |
| 4,112,347 | 9/1978 | Moerman ............................ 323/6 |
| 4,161,772 | 7/1979 | Moerman ............................ 363/44 |
| 4,162,441 | 7/1979 | Moerman ............................ 323/57 |
| 4,162,522 | 7/1979 | Moerman ............................ 363/171 |
| 4,163,190 | 7/1979 | Moerman ............................ 323/6 |
| 4,167,037 | 9/1979 | Moerman ............................ 363/79 |
| 4,251,736 | 2/1981 | Coleman ............................. 307/66 X |
| 4,513,240 | 4/1985 | Putman .............................. 323/210 |

Primary Examiner—A. D. Pellinen
Assistant Examiner—Todd DeBoer
Attorney, Agent, or Firm—Schwartz, Jeffery, Schwaab, Mack, Blumenthal & Evans

[57] ABSTRACT

A method and a system for interconnecting two electrical, alternating three phase networks operating asynchronously or synchronously at voltages of equal or adjacent frequencies, and in which, for corresponding phases, the voltages of the first and second networks are out of phase by a constant or varying angle. A plurality of three phase variable reactive impedances interconnect the two networks for carrying out a desired transfer of active power from one of the two networks to the other. The variable impedances are operated to establish between each phase of the first network and the three phases of the second network, three interconnections each having a different susceptance, which susceptances vary with the three phase variable reactive impedances. A regulator measures electrical parameters associated with at least one corresponding phase of the first and second networks, and operates the three phase variable reactive impedances to vary the susceptances of the interconnections in relation with the measured parameters so as to establish the desired transfer of active power from one of the first and second networks to the other network, while maintaining at a desired level a reactive power engaged in the transfer of active power.

37 Claims, 5 Drawing Figures

ONE-LINE DIAGRAM

ONE-LINE DIAGRAM

ONE-LINE DIAGRAM

METHOD AND SYSTEM FOR INTERCONNECTING TWO SYNCHRONOUS OR ASYNCHRONOUS ELECTRICAL ALTERNATING THREE-PHASE NETWORKS BY MEANS OF VARIABLE REACTIVE IMPEDANCES

BACKGROUND OF THE INVENTION

1. Field of the Invention

The present invention relates to a method and a system for interconnecting two three-phase alternating electrical networks operating asynchronously or synchronously at alternating voltages of equal or adjacent frequencies.

2. Related Art

In this technical field, it is known that most of the systems for interconnecting two different alternating electrical networks presently in operation are formed by interconnection ties comprising electrical power converters carrying out from one network to the other an AC - DC - AC conversion of the electrical current. Such an interconnecting system has the disadvantage of using compensators for neutralizing the internal reactive power in order to maintain the voltage at the interconnecting points at a desired level, as well as using filters for attenuating the harmonics generated by the interconnecting system.

Another known system, which can be used for interconnecting two alternating networks operating at different frequencies, is described in U.S. Pat. No. 3,275,838 (ALSTROM) granted to ASEA on Sept. 27, 1966. This interconnecting system comprises two electrical current converters connected to the two alternating networks, respectively. A regulating device measures the respective frequencies of the two networks, as well as the power transmitted from one of the two networks to the other network, and acts on at least one of the two converters for controlling and maintaining at a desired level the transfer of electrical active power from one network to the other. Such a system requires the use of a complex circuit and a conversion of the electrical current.

U.S. Pat. No. 2,218,383 (HERSKIND), granted to the GENERAL ELECTRIC COMPANY on Oct. 15, 1940, illustrates a system for interconnecting two alternating networks operating at different frequencies. Such an interconnecting system is provided with a circuit comprising transformers, electrical valves, a phase converter and other elements for obtaining a transfer of electrical power from a three-phase network to a single-phase network, the three-phase network operating at a frequency higher than the frequency at which the single-phase network operates. Obviously, this type of interconnecting system is not adapted for establishing a desired transfer of electrical power between two three-phase, asynchronous or synchronous alternating networks.

OBJECTS AND SUMMARY OF THE INVENTION

An object of the present invention is to provide a new improved method and system for interconnecting two asynchronous or synchronous, three-phase alternating electrical networks, which interconnecting system has a simple structure, is easily controllable by known methods, and uses elements available on the market. Moreover, this new method and system requires no compensator and no filter as it is the case for the above mentioned interconnection ties using electrical current converters.

More particularly, the present invention proposes a system for interconnecting a first and a second three-phase alternating electrical network operating asynchronously or synchronously at alternating voltages of equal or adjacent frequencies. Each network comprises a first, a second and a third phase operating at the voltage of this network, the voltage of each phase of the first network and the voltage of the corresponding phase of the second network being out of phase with respect to each other by a constant angle or by an angle varying in time. This interconnecting system comprises:

a plurality of three-phase variable reactive impedances interconnecting the two networks for carrying out through the three-phase variable reactive impedances a desired transfer of electrical active power from one of the first and second networks to the other network, said plurality of three-phase variable reactive impedances being operated for establishing (a) three first interconnections, each having a first susceptance, between the first phases of the first and second networks, between the second phases of the first and second networks, and between the third phases of the first and second networks, respectively, (b) three second interconnections, each having a second susceptance, between the first phase of the first network and the third phase of the second network, between the second phase of the first network and the first phase of the second network, and between the third phase of the first network and the second phase of the second network, respectively, and (c) three third interconnections, each having a third susceptance, between the first phase of the first network and the second phase of the second network, between the second phase of the first network and the third phase of the second network, and between the third phase of the first network and the first phase of the second network, respectively, the first, second and third susceptances of the first, second and third interconnections varying with the three-phase variable reactive impedances; and regulating means for measuring electrical parameters associated with at least one corresponding phase of the first and second networks and for operating said three-phase variable reactive impedances in accordance to the measured electrical parameters in order to vary the first, second and third susceptances of the first, second and third interconnections so as to establish said desired transfer of electrical active power from one of the first and second networks to the other network, while maintaining at a desired level a reactive power engaged in the desired transfer of active power.

According to a preferred embodiment of the system of the present invention, the regulating means comprises means for operating, when oscillations are produced on at least one of the first and second networks and in relation with the measured electrical parameters, the three-phase variable reactive impedances in order to establish through the plurality of three-phase variable reactive impedances a modulated transfer of electrical active power from one of the first and second networks to the other network for the purpose of damping said oscillations, this modulated transfer of active power then constituting the desired transfer of active power.

The present invention also relates to a method for interconnecting a first and a second three-phase, alternating electrical network operating asynchronously or synchronously at alternating voltages of equal or adjacent frequencies, each network comprising a first, a second and a third phase operating at the voltage of this network, the voltage of each phase of the first network and the voltage of the corresponding phase of the second network being out of phase with respect to each other by a constant angle or by an angle varying in time. This method comprises the steps of:

establishing, with a plurality of three-phase variable reactive impedances through which is carried out a desired transfer of electrical active power from one of the first and second networks to the other network, (a) three first interconnections, each having a first susceptance, between the first phases of the first and second networks, between the second phases of the first and second networks, and between the third phases of the first and second networks, respectively, (b) three second interconnections, each having a second susceptance, between the first phase of the first network and the third phase of the second network, between the second phase of the first network and the first phase of the second network, and between the third phase of the first network and the second phase of the second network, respectively, and (c) three third interconnections, each having a third susceptance, between the first phase of the first network and the second phase of the second network, between the second phase of the first network and the third phase of the second network, and between the third phase of the first network and the first phase of the second network, respectively, the first, second and third susceptances of the first, second and third interconnections varying with the three-phase variable reactive impedances;

measuring electrical parameters associated with at least one corresponding phase of the first and second networks; and operating the three-phase variable reactive impedances in accordance with these measured electrical parameters in order to vary the first, second and third susceptances of the first, second and third interconnections so as to establish the desired transfer of active power from one of the first and second networks to the other network, while maintaining at a desired level an electrical reactive power engaged in said desired transfer of electrical active power.

In accordance with a preferred embodiment of the method of the present invention, the three-phase variable reactive impedances are operated, when oscillations are produced on at least one of the first and second networks, in relation with the measured electrical parameters so as to establish through the plurality of three-phase variable reactive impedances a modulated transfer of electrical active power from one of the first and second networks to the other network for the purpose of damping these oscillations, this modulated transfer of active power then constituting the desired transfer of active power.

The three-phase variable reactive impedances may be operated in relation with the measured electrical parameters in order to cancel the electrical reactive power engaged in the desired transfer of active power, or in order that the plurality of three-phase variable reactive impedances generates or absorbs a certain amount of electrical reactive power according to the needs of the first and second networks.

According to a preferred characteristic of the present invention, the measured electrical parameters comprise, for each corresponding phase of the first and second networks, a first and a second voltage applied to the plurality of three-phase variable reactive impedances and coming from this corresponding phase of the first and second networks, respectively, and a first and a second current entering or leaving the plurality of three-phase variable reactive impedances and corresponding to this corresponding phase of the first and second networks, respectively.

According to another preferred characteristic of the present invention, the three-phase variable reactive impedances are also operated in relation to a first reference value representative of the desired transfer of active power from one of the first and second networks to the other network and with a second reference value representative of the desired level of the reactive power engaged in the desired transfer of active power.

According to the interconnecting method described hereinabove, it is also possible to interconnect two three-phase, asynchronous or synchronous networks with a plurality of three-phase variable reactive impedances connected between two polyphase voltage systems, which polyphase voltage systems may be generated by transformers having their primary windings connected to the two networks and having their secondary windings adapted to generate these polyphase voltage systems. Such voltage systems may comprise, for example, six, twelve or twenty-four phases.

BRIEF DESCRIPTION OF THE DRAWINGS

The objects, advantages and other features of the present invention will become more apparent from the following description, provided for the purpose of exemplification only, with reference to the accompanying drawings wherein.

DETAILED DESCRIPTION OF THE INVENTION

Figure 1:
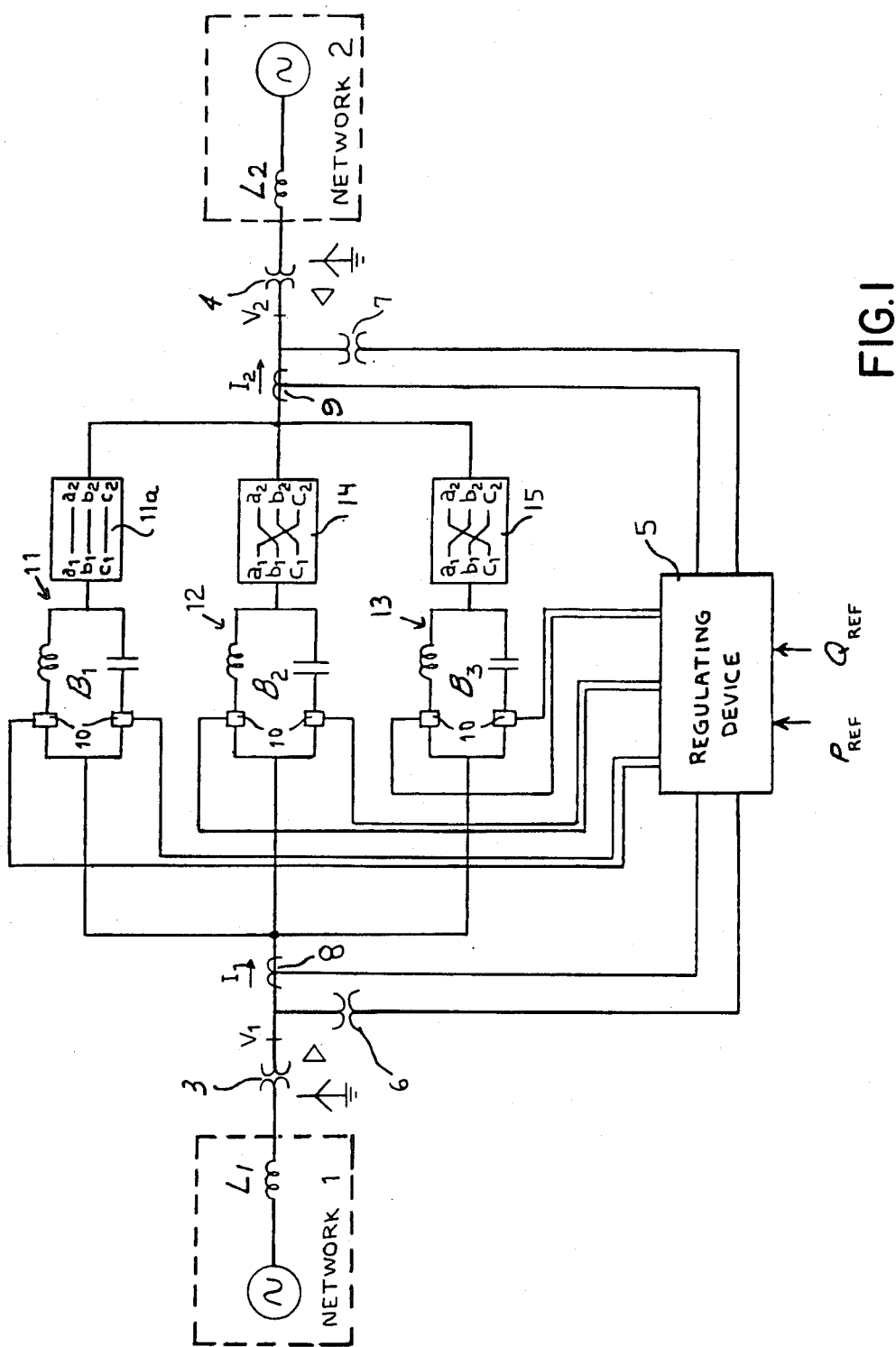
FIG. 1 is a diagram representing an embodiment of the interconnecting system according to the present invention which interconnects two three-phase, asynchronous or synchronous networks.

The three-phase, asynchronous or synchronous interconnecting system illustrated in FIG. 1, comprises three three-phase variable reactive impedances including respectively three single-phase variable reactive impedances 11 each having a susceptance $B_1$, three single-phase variable reactive impedances 12, each having a susceptance $B_2$, and three single-phase variable reactive impedances 13 each having a susceptance $B_3$. The three single-phase variable reactive impedances 11 interconnect the phases $a_1$, $b_1$ and $c_1$ of the network 1 to the phases $a_2$, $b_2$ and $c_2$ of the network 2, respectively, and the three single-phase variable reactive impedances 12 interconnect the phases $a_1$, $b_1$ and $c_1$ of the network 1 to the phases $c_2$, $a_2$ and $b_2$ of the network 2, respectively. In the latter case, the three single-phase variable reactive impedances 12 interconnect the networks 1 and 2 in carrying out a reverse transposition of the three phases from the network 1 to the network 2. The three singlephase variable reactive impedances 13 interconnect the phases $a_1$, $b_1$ and $c_1$ of the network 1 to the phases $b_2$, $c_2$ and $a_2$ of the network 2, respectively. In this case, the single-phase variable reactive impedances 13 interconnect the networks 1 and 2 in carrying out a direct transposition of the three phases from network 1 to network 2.

Two transformers 3 and 4 interconnect the three three-phase variable reactive impedances respectively to the networks 1 and 2. These two transformers 3 and 4 each comprises on one side three first windings forming a star-connected circuit having its neutral connected to ground. The three first windings of the transformers 3 and 4 are connected to the three phases of the networks 1 and 2, respectively. The transformers 3 and 4 also comprise on their other side, three second windings which form a delta-connected circuit and which are connected to the three three-phases variable reactive impedances of the interconnecting system.

It should be noted that the ratio of the transformers 3 and 4 can have any value according to the requirements of an application of the interconnecting system. Moreover, when the voltage of the two networks 1 and 2 is low enough to allow the use of thyristor valves 10 shown in FIG. 1, the three three-phase variable reactive impedances of the interconnecting system can be connected directly to the two networks without requiring use of the transformers 3 and 4, which transformers in such a case can be omitted.

The two alternating electrical networks 1 and 2, which, as above-mentioned, operate asynchronously or synchronously at alternating voltages of equal or adjacent frequencies, include respectively line inductances $L_1$ and $L_2$.

As shown in FIG. 1, the voltage $V_1$ and $V_2$ are voltages from the three phases of the two networks 1 and 2, respectively, which voltages $V_1$ and $V_2$ are applied to the three three-phase variable reactive impedances. The currents $I_1$ and $I_2$ represent currents corresponding to the different phases of the two networks 1 and 2, respectively. According to the illustrated example, the currents $I_1$ enter the variable impedances while the currents $I_2$ leave the variable impedances.

The single-phase variable reactive impedances 11, 12 and 13 are operated by a regulating device 5 shown in FIG. 1 in order to establish a desired transfer of electrical active power from one network to the other network. This desired transfer of electrical active power from one network to the other established by the regulator 5 can be, when any oscillations are produced on at least one of the first and second networks, a modulated transfer of active power, which modulation of active power is used for damping these oscillations. This regulating device 5 measures the voltages $V_1$ and $V_2$ from each phase of the two networks 1 and 2 through voltage transformers 6 and 7, and the currents $I_1$ and $I_2$ corresponding for each phase of the two networks through current transformers 8 and 9.

This regulating device 5 operates the single phase variable reactive impedances 11, 12 and 13 through the thyristor valves 10. This is shown in FIG. 1 only with respect to one of the impedances 13, in order to simplify the drawings. The amplitude and the direction of the transfer of electrical active power is selected by an input $P_{REF}$ of the regulating device 5. This regulating device 5 also comprises an input $Q_{REF}$ which may be adjusted if it is desired that the interconnecting system of FIG. 1 absorb or generate a certain amount of reactive power according to the needs of the networks 1 and 2, or if it is desired to cancel the reactive power engaged in the transfer of electrical active power from one of the two networks to the other network. The operation of this regulating device will be explained in more detail hereinafter with reference to FIG. 4 of the drawings.

Figure 2:
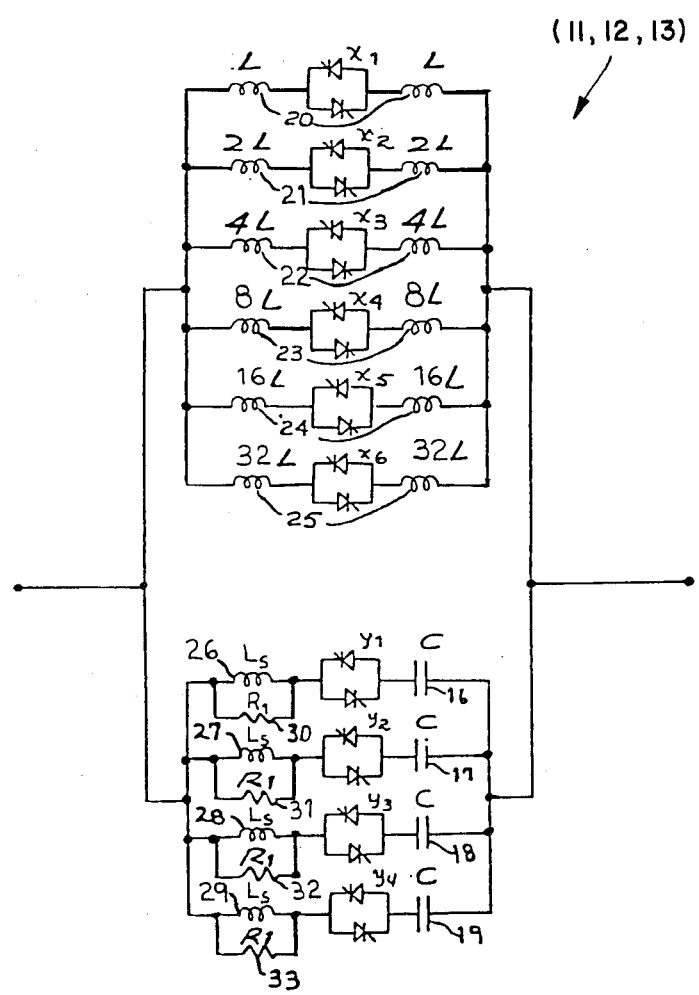
FIG. 2 illustrates an embodiment of single phase variable reactive impedances of the interconnecting system of FIG. 1.

FIG. 2 shows an embodiment of one of the single-phase variable reactive impedances 11, 12 or 13 of FIG. 1 operated through thyristor valves. Each of these single-phase variable reactive impedances, which have been represented in FIG. 1 as comprising only one inductor and only one capacitor for the purpose of simplification of the drawings, includes an inductor bank and a capacitor bank mounted in parallel.

The capacitor bank comprises one or a plurality of capacitors each having the same capacitance and which are operated through thyristor valves. In principle, one or more of these capacitors may, of course, be permanently connected.

The embodiment shown in FIG. 2 includes four capacitors 16 to 19 having the same capacitance C and which are operated through thyristor valves $Y_1$ to $Y_4$. A plurality of inductors 26 to 29, each having an inductance $L_s$ and being connected in series with each capacitor 16 to 19, respectively, are provided for limiting the rate of variation of the current when the corresponding thyristor valves are fired. A plurality of resistors 30 to 33 each having a value $R_1$ connected in parallel with each inductor 26 to 29, respectively, are provided for attenuating oscillations produced when the corresponding thyristor valves are fired. A variation of susceptance of the capacitor bank from zero to a maximum value $B_m$, required according to the application of the interconnecting system, can therefore be carried out in four steps. The following expression (1) permits the calculation of the susceptance of the capacitor bank in relation to the non-conducting or conducting state of the four thyristor valves $Y_1$ to $Y_4$.

$$B_c(Y) = B_m \sum_{i=1}^{4} Y_i 2^{-2} \tag{1}$$

In this expression, $B_m$ represents the maximum value of the susceptance of the capacitor bank when the four thyristor valves are switched on, and $B_c(Y)$ represents the value of the susceptance of the capacitor bank in relation with the open or closed state of the four thyristor valves $Y_1$ to $Y_4$. The term $Y_i$, with i varying from 1 to 4 for representing each of the thyristor valves $Y_1$ to $Y_4$, is equal to 1 if the thyristor valve is in the conducting state and equal to zero if this valve is in its non-conducting state.

The capacitance C of each capacitor 16 to 19 may be determined with the following equation (2):

$$C = \frac{B_m}{4\omega} \left[ 1 - \left( \frac{\omega}{\omega_r} \right)^2 \right] \tag{2}$$

$$\omega_r = \frac{1}{\sqrt{L_s C}}, R_1 >> \omega L_s$$

where $\omega$ represents the angular speed of a vector rotating at the frequency of the network and $\omega_r$ represents the angular speed of a vector rotating at the resonant frequency of the network formed by one of the capacitors 16 to 19 of capacitance C and one of the inductors 26 to 29 of inductance $L_S$.

The inductor bank comprises a plurality of inductors connected in parallel, each inductor being connected or disconnected through an associated thyristor valve. The embodiment shown in FIG. 2 includes a bank of six inductors 20 to 25 having respective susceptances, which susceptances have values which follow a geometric progression from 1/2L to 1/64L. More particularly, the value of each inductor may be determined by the expression $L(n) = 2^n L$, where $L(n)$ is the value of each inductor, L is an inductance value determined according to the requirements of an application of the interconnecting system, and n varies from 1 to the total number of inductors which, in the illustrated case, is equal to 6.

Such an assembly gives a possibility of variation of the total susceptance of the inductor bank from zero to a maximum value $-(1-2^{-6}) B_m$, when the six thyristor valves $X_1$ to $X_6$ are in their conducting state, through 64 equal steps in relation to the non-conducting or conducting state of the six thyristor valves $X_1$ to $X_6$. The following expression (3) gives the value of the susceptance of the inductor bank formed by the inductors 20 to 25 in accordance with the non-conducting or conducting state of the thyristor valves $X_1$ to $X_6$.

$$B_L(X) = -B_m \sum_{k=1}^{6} X_k 2^{-k} \quad (3)$$

In this expression, $B_m$ is the maximum value defined hereinabove, $B_L(X)$ represents the value of the susceptance of the inductor bank in relation to the nonconducting or conducting state of the thyristor valves $X_1$ to $X_6$, and $X_k$, with k varying from 1 to 6 to represent each thyristor valve $X_1$ to $X_6$, is equal to 1 when the valve is in its conducting state and to 0 when the valve is in its non-conducting state.

The above defined inductance value L can be calculated from the value $B_m$, required for a specific application of the interconnecting system, by the following equation (4):

$$L = \frac{1}{\omega B_m} \quad (4)$$

where $\omega$ and $B_m$ have been defined hereinabove.

The embodiment of FIG. 2 shows that each of the six inductors 20 to 25 is divided into two separate inductors, the thyristor valve corresponding to each inductor being disposed between the two separate inductors to provide better protection for the thyristor valves and the associated equipment. This equipment and the thyristor valves are provided to operate the inductors. In principle, one of the inductors 20 to 25 could possibly be controlled almost continuously by controlling the firing angle of the corresponding thyristor valve, to thereby permit a smooth variation of the susceptance. However, such an inductor would generate harmonics. As demonstrated by the equations 1 and 3 above, the variation of the total susceptance of the capacitor bank and the inductor bank by means of the thyristor valves $Y_1$ to $Y_4$ and $X_1$ to $X_6$ can be carried out from a minimum inductive susceptance $B_{min}$ equal to $-(1-2^{-6}) B_m$ to a maximum capacitive susceptance $B_{max}$ equal to $B_m$.

Such a variation of the total susceptance is carried out from the minimum susceptance to the maximum susceptance through 128 steps. More particularly, the capacitors 16 to 19 and the inductors 20 to 21 are used for carrying out a variation by large steps of the susceptance while the inductors 22 to 25 are used for carrying out a smoother variation of the susceptance by 16 small steps between each large step above-mentioned. Of course, the inductors 22 to 25 are also used for increasing the inductive susceptance over the susceptance given by the inductors 20 and 21.

In carrying out the interconnection method according to the present invention, it can be seen that when one of the susceptances $B_1$, $B_2$ and $B_3$ of FIG. 1 is inductive, the two other susceptances are both capacitive or capacitive and equal to zero, respectively, and when one of these three susceptances is capacitive, the two other susceptances are both inductive or inductive and equal to zero, respectively.

Figure 3B:
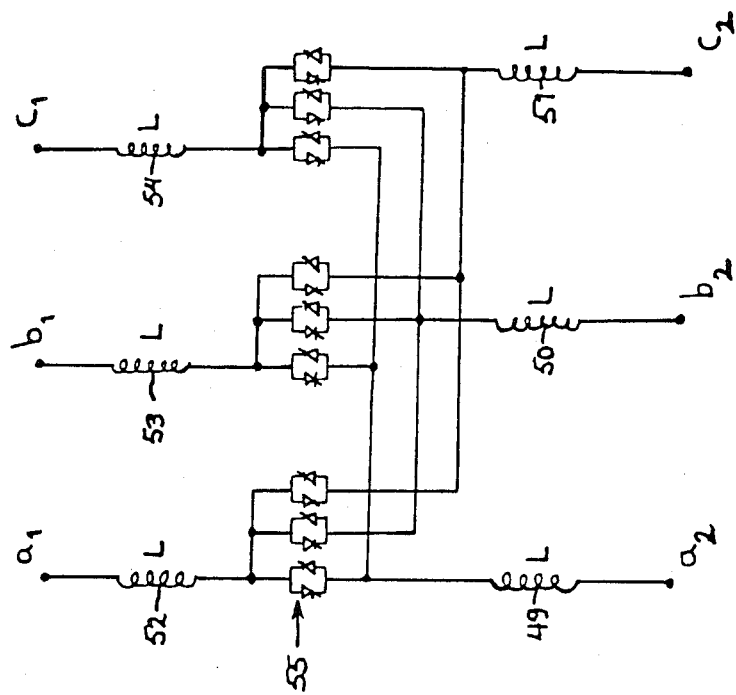
FIGS. 3(A) and 3(B) show an embodiment of three-phase variable reactive impedance which can be used in the interconnecting system according to the present invention.
Figure 3A:
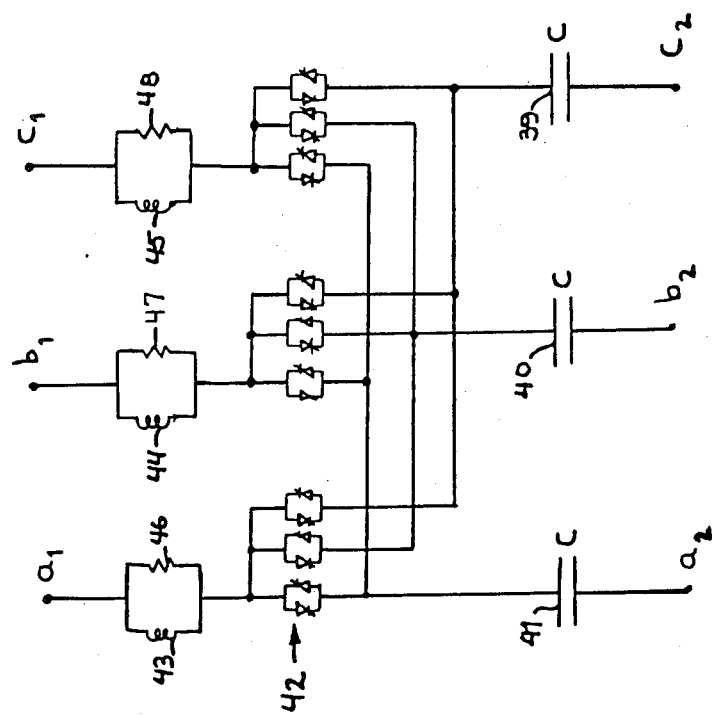

This acknowledgment allows a substantial reduction in the number of inductors and capacitors necessary for interconnecting the two networks 1 and 2 when assemblies as shown in FIGS. 3(A) and 3(B) are used.

In the embodiment of FIG. 3(A), each capacitor 16 to 19 of FIG. 2 of all the single-phase variable reactive impedances 11, 12 and 13, can be replaced by three capacitors 39 to 41 having a same capacitance C. This assembly allows the interconnection of each phase of network 1 with each phase of network 2 through one of the capacitors 39 to 41 by appropriately controlling the thyristor valves 42 through the regulating device 5 of FIG. 1. The inductors 43 to 45 and the resistors 46 to 48, having the same functions as the inductors 26 to 29 and the resistors 30 to 33 of FIG. 2, are also provided in such an assembly.

The inductance 20 of FIG. 2 of all the singlephase variable reactive impedances 11, 12 and 13 can also be replaced by the inductors 49 to 54 of inductance L which are operated through thyristor valves 55 controlled by the regulating device 5 of FIG. 1. Of course, each inductor 21 to 25 of FIG. 2 of all the reactive impedances 11, 12 and 13 can also be replaced by a similar assembly. Each phase of the network 1 can therefore be connected with each phase of the network 2 through two inductors amongst the inductors 49 to 54 by appropriately controlling the conduction of the thyristor valves 55. However, it should be noted that, supplemental to the assemblies illustrated in FIGS. 3(A) and 3(B) for replacing each inductor and each capacitor shown in FIG. 2 of all the single-phase variable reactive impedances 11, 12 and 13, some supplementary assemblies of this type for some of the inductors 20 to 25 of FIG. 2 must also be provided to produce, by means of such assemblies, all the possibilities, in relation to the phase angle δ between the voltages of the corresponding phases of the networks 1 and 2, for the values of the susceptances $B_1$ to $B_3$ of the interconnections defined with reference to FIG. 1.

As already mentioned, such an embodiment of three-phase variable reactive impedances considerably reduces the number of inductors and capacitors while carrying the same functions into practice. However, the software and the structure of the regulating device 5 of FIG. 1 must, to some extent, be modified as, for example, when using the assemblies illustrated in FIGS. 3(A) and 3(B), there is a larger number of thyristor valves to be controlled. Nevertheless, these assemblies are advantageous in that they allow the optimizing of the equipment.

It is important to note that, when the three-phase variable reactive impedances are embodied as shown in FIGS. 3(A) and 3(B), the interconnections established between the three phases of the two networks 1 and 2 must remain the same as those defined with reference to FIG. 1 of the drawings. The susceptances $B_1$, $B_2$ and $B_3$ of these interconnections must also vary in the same manner in relation to the phase angle 67.

A transfer of electrical active power from network 1 to network 2 has been defined with reference to FIG. 1. However, it should be noted that the same concept can be applied for carrying out a transfer of electrical active power from network 2 to network 1.

The principle of operation of the interconnecting system according to the present invention is the following.

If a maximum capacitive susceptance is connected between two voltages out of phase by a phase angle $\delta$, a maximum transfer of electrical active power is transmitted through the interconnecting reactive impedance. On the other hand, if a maximum inductive susceptance, having the same absolute value as the maximum capacitive susceptance, is connected between two voltages out of phase by the same phase angle, the same transfer of electrical active power is carried out through the interconnecting reactive impedance, but in an opposite direction. A variation of the susceptance of the variable reactive impedances therefore allows variations in the level and the direction of the electrical active power transferred by the interconnecting system from one network to the other. A certain amount of electrical reactive power is engaged in this transfer of electrical active power (generation or absorption of reactive power by the variable reactive impedances of the interconnecting system). These active and reactive electrical powers depend at the same time on the phase angle $\delta$ between the voltages $V_1$ and $V_2$ of the corresponding phases of the two networks as well as on the amplitude of these voltages $V_1$ and $V_2$.

A transfer of electrical active power can therefore be established from one of the two networks 1 and 2 to the other network by appropriately selecting the values of the interconnecting reactive impedances taking into consideration the phase angle $\delta$ between the voltages $V_1$ and $V_2$ from each corresponding phase of networks 1 and 2 and the amplitude of these voltages $V_1$ and $V_2$. If such an interconnection is carried out by means of variable inductors, the interconnecting system will absorb an electrical reactive power which must be externally compensated. When the interconnection is carried out through variable capacitors, the interconnecting system produces an amount of electrical reactive power. If the interconnecting reactive impedances are composed from inductors and capacitors as above described, the transfer of active power from one network to the other can be carried out more efficiently as it is possible for the interconnecting system to internally compensate the electrical reactive power engaged in the transfer of electrical active power.

The active and reactive powers can be expressed by the following equations 5 and 6.

$$P_i = B_i V_1 V_2 \sin \delta_i \quad (5)$$

$$Q_i = B_i (V_1^2 + V_2^2 - 2V_1 V_2 \cos \delta_i) \quad (6)$$

where $$\delta_i = \delta - (i-1) 2\pi/3$$

$i = 1$, 2 and 3.

When the angle $\delta_i$ becomes equal to zero, the transferred active power $P_i$ also becomes equal to zero, but it remains an engaged reactive power $Q_i$ if the voltages $V_1$ and $V_2$ have different values. If the angle $\delta_i$ is equal to $\pi$ radians, no active power $P_i$ is transferred, but the engaged reactive power $Q_i$ has a maximum value. However, when three three-phase variable reactive impedances establish the interconnections of susceptances $B_1$, $B_2$ and $B_3$ and are respectively connected between voltages out of phase by an angle $\delta_1$, $\delta_2$ and $\delta_3$, these three angles being themselves out of phase with respect to each other by an angle of $2\pi/3$ radians, a transfer of electrical active power is possible for any value of the phase angle $\delta$ between the voltages $V_1$ and $V_2$ of the corresponding phases of the two networks 1 and 2.

Moreover, when the interconnecting system is controllable through the three variables $B_1$, $B_2$ and $B_3$ or through two variables when one of the angles $\delta_i$ is equal to zero or to $\pi$ radians, a desired transfer of electrical active power can be established:

$$P_1 + P_2 + P_3 = P_{REF}$$

by means of the regulating device 5 of FIG. 1. Regulating devices can also carry out supplementary functions such as internal compensation of the internal reactive power engaged in the transfer of electrical active power, or the generation or the absorption, by means of the interconnecting threephase variable reactive impedances, of a certain amount of electrical reactive power according to the requirements or needs of the networks 1 and 2. This absorption or generation of reactive power may be expressed as follows:

$$Q_1 + Q_2 + Q_3 = Q_{REF}$$

The regulating device 5 can therefore carry out the above functions while minimizing the absolute value of the engaged internal reactive power of the interconnecting system and minimizing the rate of variation of the susceptances $B_1$, $B_2$ and $B_3$ for the different angular values of the phase angle $\delta$ between the voltages $V_1$ and $V_2$ of the corresponding phases of the networks 1 and 2.

In principle, the regulating device 5 could also carry out other additional functions such as, for example, a stabilization of the mean value of the voltages $V_1$ and $V_2$ of the networks 1 and 2 at the interconnecting point, i.e., to act as a static compensator of electrical reactive power, etc..

The structure of the regulating device 5 of FIG. 1 depends, therefore, in general, on the required regulating functions as well as the synthesis method used for carrying out these regulating functions.

Figure 4:
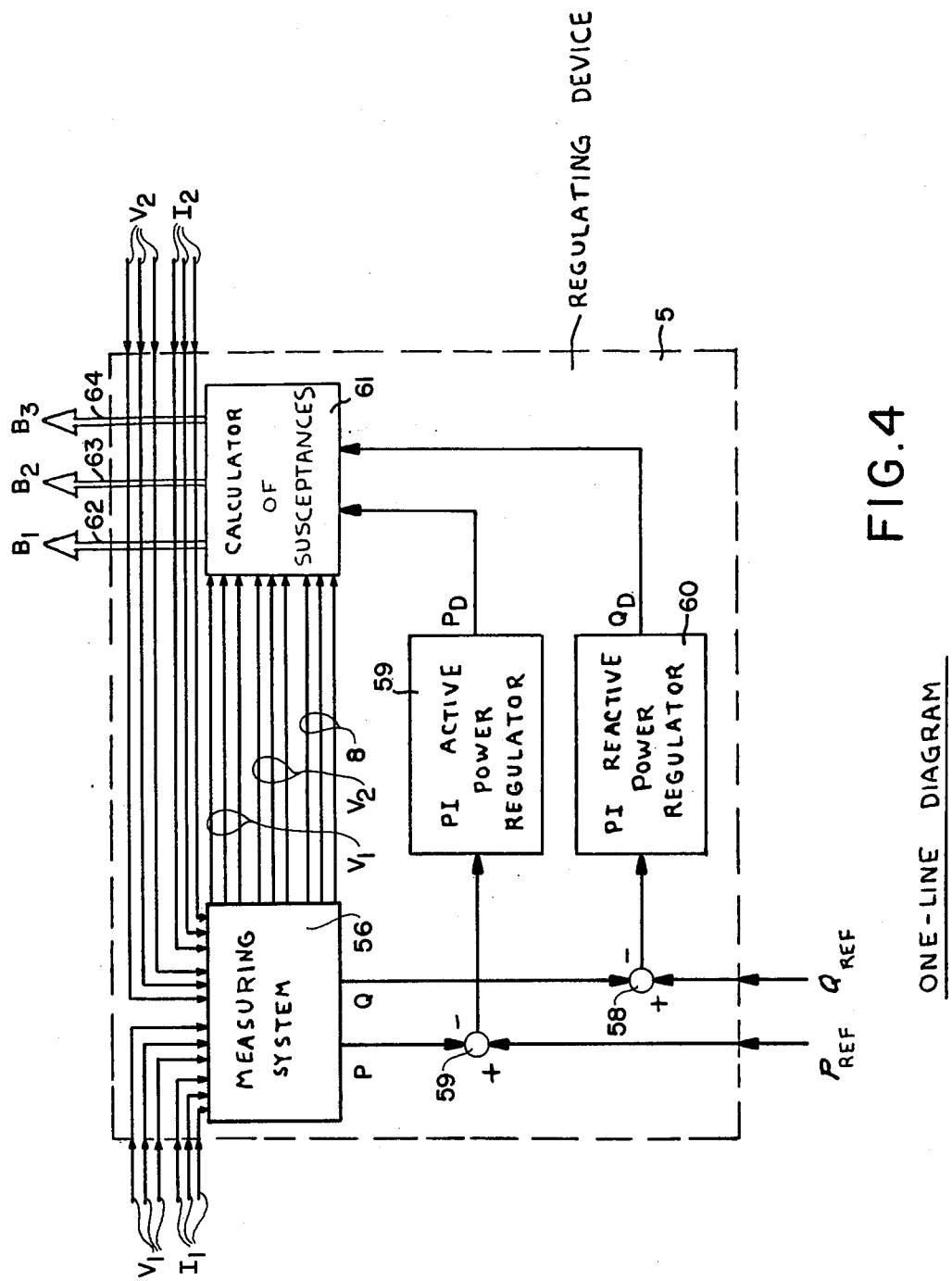
FIG. 4 is a block diagram of the regulating device of the interconnecting system shown in FIG. 1.
Figure 1:
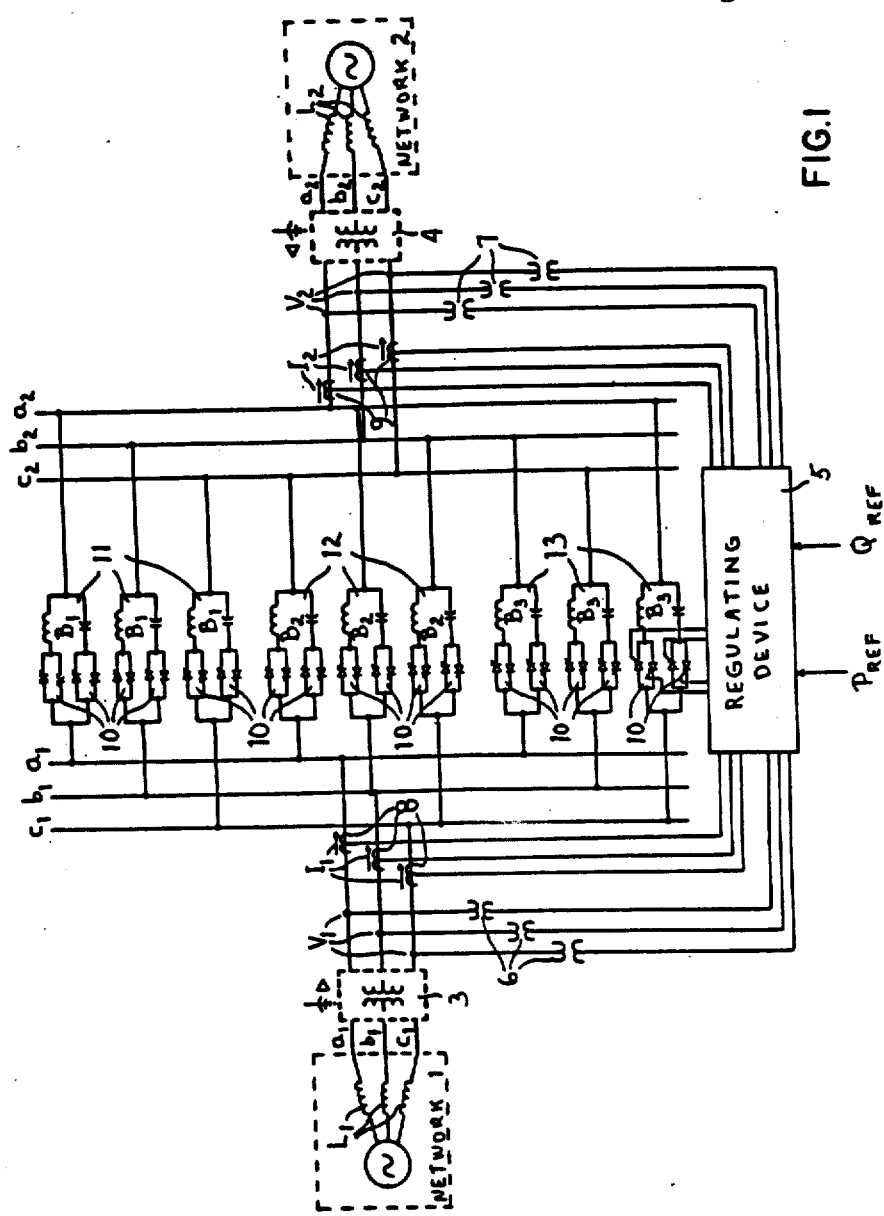
Figure 4:
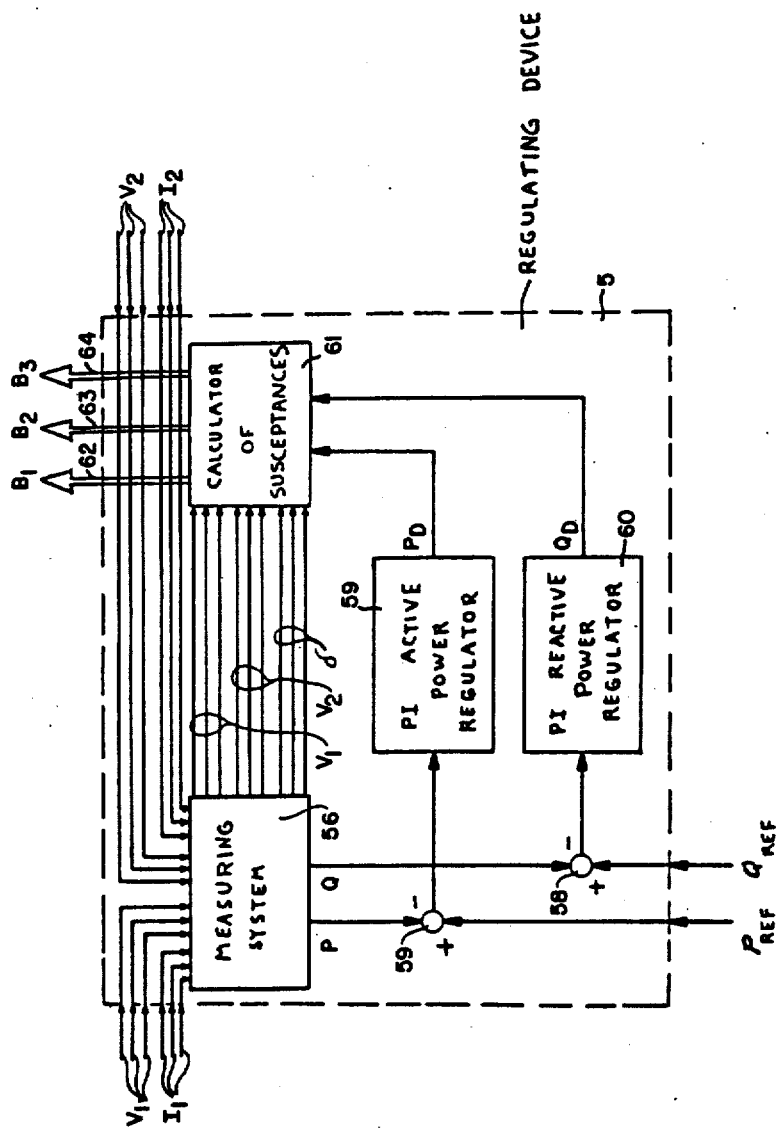

A possible embodiment for the regulating device 5 of FIG. 1 is shown in detail in FIG. 4.

A measuring system 56 produces signals representative of (1) the electrical active three-phase power P actually transferred by the interconnecting system, (2) the value Q of the reactive three-phase power engaged in the actual transfer of active power, and (3), for each corresponding phase of the first and second networks, the amplitude of the voltages $V_1$ and $V_2$ and the phase angle $\delta$ between these two voltages $V_1$ and $V_2$. These signals are derived from the measure of these voltages $V_1$ and $V_2$ corresponding to the corresponding phases of networks 1 and 2 and applied to the variable reactive impedances of the interconnecting system, as well as from the measure of the currents $I_1$ and/or $I_2$ defined with reference to FIG. 1 and corresponding to the same corresponding phases of networks 1 and 2 as the voltages $V_1$ and $V_2$. The differences between the measured powers P and Q and the input reference values $P_{REF}$ and $Q_{REF}$, which are determined by two subtracting circuits 57 and 58 are processed by means of two regulators 59 and 60 of the proportional integral (P-I) type, having proportionality factors optimally adjusted, for determining values of required powers $P_d$ and $Q_d$.

A calculator 61 calculates the susceptances $B_1$, $B_2$ and $B_3$ from the required powers $P_D$ and $Q_D$ generated respectively by the active power and reactive power regulators 59 and 60, as well as the values of the voltages $V_1$ and $V_2$, and from the value of the phase angle δ delivered by the measuring system 56 for each corresponding phase of the networks 1 and 2. By controlling the firing of the thyristor valves of the three-phase variable reactive impedances of the interconnecting system, through the outputs 62 to 64, the calculator 61 establishes the above defined interconnections having the susceptances $B_1$, $B_2$ and $B_3$.

In carrying out this calculation, the above defined optimizing criterion is minimized while respecting the reference values $P_{REF}$ and $Q_{REF}$ for the transfer of active power from one network to the other and the generation and/or absorption of reactive power by the interconnecting system. By means of closed loops, the regulating device 5 responds to the differences between the reference values $P_{REF}$ and $Q_{REF}$ and the measured values P and Q by gradually and rapidly bringing the values P and Q to the required level when the same are not equal to reference values $P_{REF}$ and $Q_{REF}$.

Another system not shown in FIG. 4 is provided for synchronizing the firing of the thyristor valves of the variable reactive impedances establishing the interconnection of susceptances $B_1$, $B_2$ and $B_3$ in order to reduce the transitory current components in the inductors and the capacitors of these variable reactive impedances at the moment of firing of these thyristor valves. This function is carried out by firing the thyristor valve of an inductor when the voltage applied across this thyristor valve has a maximum value, thus preventing the production of harmonics, and by firing the thyristor valve of a capacitor when the value of the voltage across the thyristor valve has a minimum value taking into consideration a residual voltage across the capacitor.

It should also be mentioned that the transformers 3 and 4 could also be formed by equipment adapted to apply to the terminals of the three-phase variable reactive impedances of the interconnecting system, a polyphase voltage system having, for example, 6 phases. In this case, the interconnecting system would comprise a plurality of three-phase variable reactive impedances for interconnecting the three phases of networks 1 and 2 through interconnections having the susceptances $B_1$, $B_2$ and $B_3$ in the same manner as described with reference to FIG. 1 of the drawings. Such an assembly would be advantageous in that it would allow the use of equipment having a smaller capacity, consequently reducing the cost of the interconnecting system itself, as well as the absolute value of the engaged reactive power.

As the present invention has been described with reference to a particular embodiment, it should be noted that modifications could be made, for example modifications in the circuit or replacement of the described elements by equipment adapted for carrying out the same functions, without changing the nature of the present invention.

The structure of the above described embodiment of the interconnecting system can of course be modified at will, within the scope of the appended claims, without altering or modifying the inventive idea from which originates the present invention.

The embodiments of the invention in which an exclusive property or privilege is claimed are defined as follows:

1. A system interconnecting a first and a second three-phase alternating electrical network adapted to operate asynchronously and synchronously at alternating voltages of equal or adjacent frequencies, each network comprising a first, a second and a third phase operating at the alternating voltage of this network, the laternating voltage of each phase of the first network and the alternating voltage of the corresponding phase of the second network being out of phase with respect to each other by a first angle, comprising:

a plurality of three-phase variable reactive impedance means for interconnecting the two networks and carrying out through the three-phase variable reactive impedances a desired transfer of electrical active power from one of the first and second networks to the other network, said three-phase variable reactive impedance means being adapted to establish (a) three first interconnections, each having a first susceptance, between the first phases of the first and second networks, between the second phases of the first and second networks, and between the third phases of the first and second networks, respectively, (b) three second interconnections, each having a second susceptance, between the first phase of the first network and the third phase of the second network, between the second phase of the first network and the first phase of the second network, and between the third phase of the first network and the second phase of the second network, respectively, and (c) three third interconnections, each having a third susceptance, between the first phase of the first network and the second phase of the second network, between the second phase of the first network and the third phase of the second network, and between the third phase of the first network and the first phase of the second network, respectively, said first, second and third susceptances of said first, second and third interconnections varying with said three-phase variable reactive impedances; and regulating means for measuring electrical parameters associated with at least one corresponding phase of the first and second networks, and for operating said three-phase variable reactive impedances in relation to said measured electrical parameters in order to vary the first, second and third susceptances of said first, second and third interconnections so as to establish said desired transfer of active electrical power from one of the first and second networks to the other network while maintaining at a desired level an electrical reactive power engaged in said desired transfer of active power.

2. The interconnecting system of claim 1, wherein said regulating means comprises means for operating the three-phase variable reactive impedance means in accordance with said measured electrical parameters in order to cancel the electrical reactive power engaged in said desired transfer of electrical active power, and in order that said three-phase variable reactive impedance means generate and absorb a certain amount of electrical reactive power according to the requirements of the first and second networks.

3. The interconnecting system of claim 1, wherein said plurality of three-phase variable reactive a impedance means comprise three-phase variable reactive a impedance means including respectively three first, three second and three third single-phase variable reactive impedances, the first single-phase variable reactive impedances establishing respectively said three first interconnections having the first susceptence, said second single-phase variable reactive impedances establishing respectively the three second interconnections having the second susceptance, and the third single-phase variable reactive impedances establishing respectively the three third interconnections having the third susceptance.

4. The interconnecting system of claim 1, wherein each three-phase variable reactive impedance means comprises three single-phase variable reactive impedances each comprising a bank of inductances and capacitors having fixed inductances and capacitances and being connected in parallel, and a commutating means, wherein each capacitor and each inductor is operated by the regulating means through the commutating means.

5. The interconnecting system of claim 4, wherein said commutating means of each single-phase variable reactive impedance comprises a thyristor valve for each inductor and each capacitor.

6. The interconnecting system of claim 5, wherein each inductor of the bank is formed by first and second inductors each having the same inductance and being series connected, the thyristor valve associated with the respective inductor being mounted in series with and between said first and second inductors of the same inductance forming said inductor.

7. The interconnecting system of claim 5, wherein, in each single-phase variable impedance, each capacitor is series connected with an inductor mounted in parallel with a resistor, the thyristor valve associated with said capacitor being disposed in series with and between the capacitor and said inductor mounted in parallel with said resistor.

8. The interconnecting system of claim 4, wherein the inductances of the inductors of each single-phase variable reactive impedance are determined by the expression $L(n) = 2^n L$, where $L(n)$ is the inductance of each inductor, L is a predetermined inductance value and n varies from 1 to x, x being the total number of inductors in each single-phase variable reactive impedance.

9. The interconnecting system of claim 4, wherein said capacitors of each single-phase variable reactive impedance all have the same capacitance.

10. The interconnecting system of claim 1, wherein each three-phase variable reactive impedance means comprises a group of capacitors of fixed capacitances, and commutating means, said group permitting an interconnection between each phase of the first network and each phase of the second network and being operated by said regulating means through said commutating means.

11. The interconnecting system of claim 10, wherein said commutating means of said group comprise a plurality of thyristor valves.

12. The interconnecting system of claim 10, wherein said group of capacitors comprises three capacitors each having a first and a second terminal, the first terminals of said three capacitors of said group being respectively connected to the three phases of one of the first and second networks, and the second terminals of these three capacitors being connected to the other of said first and second networks through said commutating means of said group, said commutating means being mounted so as to allow interconnection of the second terminals of the three capacitors with the three phases of said other network permitting the establishment, between each phase of the first network and each phase of the second network, of an interconnection through one of said three capacitors.

13. The interconnecting system of claim 12, wherein the three capacitors of said group all have the same capacitance.

14. The interconnecting system of claim 12, wherein said commutating means of said group are connected to the three phases of said other network respectively through three impedances, each formed by an inductor mounted in parallel with a resistor.

15. The interconnecting system of claim 1, wherein said measured electrical parameters comprise three first and three second voltages applied to said plurality of three-phase variable reactive impedance means and corresponding to the phase of the first and second networks, respectively, and three first and three second currents flowing through said plurality of three-phase variable impedance means and corresponding respectively to the phases of the first and second networks as the first and second voltages, said regulating means comprising a device means for measuring the first and second voltages and the first and second currents, and for producing from these measured voltages and currents, output signals representative of the measured first voltages, of the measured second voltages, of a phase angle, for each corresponding phase of the first and second networks, between the measured first and second voltages of this corresponding phase, of an actual transfer of electrical active power through said plurality of three-phase variable reactive impedance means from one of the first and second networks to the other network, and of a measure of electrical reactive power engaged in said actual transfer of active power.

16. The interconnecting system of claim 15, wherein said regulating means comprises a first input supplied with a first reference value representative of the desired transfer of electrical active power from one of the first and second networks to the other network, a second input supplied with a second reference value representative of the desired level of the reactive power engaged in said desired transfer of active power, and a circuit means for producing a signal representative of a required active power and a signal representative of a required reactive power, from the first and second reference values and from the output signals representative of said actual transfer of electrical active power through said plurality of three-phase variable reactive impedance means, and of the measure of the electrical reactive power engaged in said actual transfer of active power.

17. The interconnecting system of claim 16, wherein said producing circuit means comprises a first subtracting circuit and an active power regulator of the proportional-integral type, the first subtracting circuit producing a signal representative of a difference between the first reference value and the output signal representative of the actual transfer of electrical active power and delivering the difference signal to the active power regulator, the active power regulator delivering said signal representative of a required active power, said producing circuit means also comprising a second subtracting circuit and a reactive power regulator of the proportional integral type, said second subtracting circuit producing a signal representative of a difference between the second reference value and the output signal representative of the measure of the reactive power engaged in said actual transfer of active power and delivering the difference signal to the reactive power regulator, the reactive power regulator delivering said signal representative of the required reactive power.

18. The interconnecting system of claim 16, wherein said regulating means comprises a sub-system means for calculating values of the first, second and third susceptances of said first, second and third interconnections, from said output signals representative of the measured first voltages, of the measured second voltages, and of the phase angles between the first and the second measured voltages, and from the signal representative of the required active power and the signal representative of the required reactive power, and for varying said three-phase variable reactive impedance means to give these values to the first, second and third susceptances of said first, second and third interconnections for establishing said desired transfer of electrical active power through said plurality of three-phase variable reactive impedance means from one of the first and second networks to the other network, while maintaining at the desired level the electrical reactive power engaged in said desired transfer of electrical active power.

19. The interconnecting system of claim 18, wherein said plurality of three-phase variable reactive impedance means comprises a plurality of thyristor valves through which the three-phase variable reactive impedances are operated by the regulating means, said regulating means comprising synchronizing means cooperating with said subsystem for controlling firing of the thyristor valves so as to reduce current transitory components through the three-phase variable reactive impedances when said thyristor valves are fired.

20. The interconnecting system of claim 1, wherein said three phases of at least one of the first and second networks are connected to said plurality of three-phase variable reactive impedance means through a transformer.

21. The interconnecting system of claim 20, wherein said transformer comprises three first windings and three second windings, said three first windings of the transformer being connected to said three phases of the corresponding network and forming a star connected circuit having a neutral connected to the ground, and the three second windings of the transformer forming a delta-connected circuit and being connected to said plurality of three-phase variable reactive impedance means.

22. The interconnecting system of claim 1, wherein at least one of the first and second networks is connected to said plurality of three-phase variable reactive impedance means through a transformer, the transformer comprising first windings connected to the three phases of this network, the transformer also comprising second windings connected to said plurality of three-phase variable reactive impedances and cooperating with said first windings for producing, from the three phases of the corresponding network, a polyphase voltage system applied to said plurality of three-phase variable reactive impedance means.

23. The interconnecting system of claim 1, wherein said regulating means comprises means for operating, when oscillations are produced on at least one of the first and second networks and in relation with said measured electrical parameters, the three-phase variable reactive impedances so as to establish through said plurality of three-phase variable reactive impedance means a modulated transfer of active power from one of the first and second networks to the other network for the purpose of damping said oscillations, said modulated transfer of active power then constituting said desired transfer of active power.

24. The interconnecting system of claim 1, wherein said first angle is contant.

25. The interconnecting angle of claim 1, wherein said first angle is variable.

26. The interconnecting system of claim 1, wherein each three-phase variable reactive impedance means comprises a group of inductors of fixed inductances, and commutating means said group permitting an interconnection between each phase of the first network and each phase of the second network and being operated by said regulating means through said commutating means.

27. The interconnecting system of claim 26, wherein said group of inductors comprises three first inductors and three second inductors each comprising a first and a second terminal, the three first inductors being connected by their first terminals to the three phases of the first network, respectively, and the three second inductances having their first terminals connected to the three phases of the second network, respectively, said commutating means of said group being mounted so as to allow interconnection of the second terminals of the three first inductors with the second terminals of the three second inductors permitting the establishment, between each phase of the first network and each of the second network, of an interconnection through one of said first inductors and one of said second inductors.

28. The interconnecting system of claim 27, wherein said three first inductors and said three second inductors all have the same inductance.

29. A method for interconnecting a first and a second three-phase alternating electrical network operating asynchronously or synchronously at alternating voltages of equal or adjacent frequencies, each network comprising a first, a second and a third phase operating at the alternating voltage of this network, the voltage of each phase of the first network and the voltage of the corresponding phase of the second network being out of phase with respect to each other by a first angle, said method comprising the step of:

establishing, with a plurality of three-phase variable reactive impedance means for carrying out a desired transfer of electrical active power from one of the first and second networks to the other network, (a) three first interconnections, each having a first susceptance, between the first phases of the first and second networks, between the second phases of the first and second networks, and between the third phases of the first and second networks, respectively, (b) three second interconnections, each having a second susceptance, between the first phase of the first network and the third phase of the second network, between the second phase of the first network and the first phase of the second network, and between the third phase of the first network and the second phase of the second network, respectively, and (c) three third interconnections, each having a third susceptance, respectively, between the first phase of the first network and the second phase of the second network, between the second phase of the first network and the third phase of the second network, and between the third phase of the first network and the first phase of the second network, said first, second and third susceptances of said first, second and third interconncetions varying with said three-phase variable reactive impedance means;

measuring electrical parameters associated with at least one corresponding phase of the first and second networks; and operating said three-phase variable reactive impedance means in relation with said measured electrical parameters in order to vary the first, second and third susceptances of said first, second and third interconnections so as to establish said desired transfer of electrical active power from one of the first and second networks to the other network, while maintaining at a desired level an electrical reactive power engaged in said desired transfer of electrical active power.

30. An interconnecting method according to claim 29, wherein said three-phase variable reactive impedance means are operated in relation to said measured electrical parameters in order to cancel the electrical reactive power engaged in said desired transfer of electrical active power, or in order that said plurality of three-phase variable reactive impedance means absorb and generate a certain amount of electrical reactive power according to the needs of the first and second networks.

31. An interconnecting method according to claim 29, wherein said measured electrical parameters comprise, for each corresponding phase of the first and second networks, a first and a second voltage applied to said plurality of three-phase variable reactive impedance means and corresponding to this corresponding phase of the first and second networks, respectively, and a first and a second current entering or leaving said plurality of three-phase variable reactive impedances and also corresponding to this corresponding phase of the first and second networks as the first and second voltages, respectively.

32. An interconnecting method according to claim 29, wherein said three-phase variable reactive impedance means are also operated in relation to a first reference value representative of the desired transfer of electrical power from one of the first and second networks to the other network, and in relation to a second reference value representative of the desired level of the electrical reactive power engaged in said desired transfer of active power.

33. An interconnecting method according to claim 29, comprising the step of connecting the three phases of at least one of the first and second networks to said plurality of three-phase variable reactive impedance means through a transformer.

34. An interconnecting method according to claim 33, wherein said transformer produces from the three phases of the corresponding network, a polyphase voltage system which is applied to said plurality of three-phase variable reactive impedances.

35. An interconnecting method according to claim 29, wherein said three-phase variable reactive impedance means are operated, when oscillations are produced on at least one of the first and second networks, in relation with said measured electrical parameters so as to establish through said plurality of three-phase variable reactive impedance means a modulated transfer of electrical active power from one of the first and second networks to the other network for the purpose of damping said oscillations, said modulated transfer of active power then constituting said desired transfer of active power.

36. The method of claim 29, wherein said first angle is constant.

37. The method of claim 24, wherein said first angle is variable.

* * * * *

UNITED STATES PATENT AND TRADEMARK OFFICE
CERTIFICATE OF CORRECTION

PATENT NO. : 4,621,198

DATED : November 4, 1986

INVENTOR(S) : Gerald Roberge et al.

It is certified that error appears in the above-identified patent and that said Letters Patent is hereby corrected as shown below:

The title page showing the illustrative figure should appear as shown on the attached sheet.

Figures 1 and 4 should appear as shown on the attached sheets.

Signed and Sealed this

Twenty-eighth Day of April, 1987

*Attest:*

DONALD J. QUIGG

*Attesting Officer*  *Commissioner of Patents and Trademarks*

United States Patent [19]

Roberge et al.

[11] Patent Number: 4,621,198
[45] Date of Patent: Nov. 4, 1986

[54] METHOD AND SYSTEM FOR INTERCONNECTING TWO SYNCHRONOUS OR ASYNCHRONOUS ELECTRICAL ALTERNATING THREE-PHASE NETWORKS BY MEANS OF VARIABLE REACTIVE IMPEDANCES

[75] Inventors: Gérald Roberge, Repentigny; Momcilo Gavrilovic, Westmount; Pierre Pelletier, Boucherville, all of Canada

[73] Assignee: Hydro-Quebec, Montreal, Canada

[21] Appl. No.: 613,221

[22] Filed: May 23, 1984

[30] Foreign Application Priority Data

Jun. 14, 1983 [CA] Canada .................................. 430314

[51] Int. Cl.⁴ .......................... H02J 3/34; H02J 3/18
[52] U.S. Cl. ........................................ 307/82; 307/87; 323/211
[58] Field of Search ................. 307/20, 52, 82, 85–87, 307/72–74, 75; 323/207–211, 217, 218; 363/149, 156, 160

[56] References Cited

U.S. PATENT DOCUMENTS

| | | |
|---|---|---|
| 732,204 | 6/1903 | Lunt . |
| 1,917,921 | 7/1933 | Burton . |
| 2,218,383 | 10/1940 | Herskind ............................ 172/281 |
| 2,309,586 | 1/1943 | Haines .................................. 172/281 |
| 2,395,389 | 2/1946 | Huge ................................... 172/281 |
| 2,896,090 | 7/1959 | Feder ...................................... 307/88 |
| 3,211,914 | 10/1965 | Anderson ................................... 307/3 |
| 3,275,838 | 9/1966 | Almstrom .............................. 307/82 |
| 3,992,661 | 11/1976 | Kelley, Jr. et al. .................. 323/210 |
| 4,020,440 | 4/1977 | Moerman .............................. 336/155 |
| 4,028,614 | 6/1977 | Kelley, Jr. et al. ................. 323/210 |
| 4,112,347 | 9/1978 | Moerman ................................. 323/6 |
| 4,161,772 | 7/1979 | Moerman .............................. 363/44 |
| 4,162,441 | 7/1979 | Moerman .............................. 323/57 |
| 4,162,522 | 7/1979 | Moerman ............................. 363/171 |
| 4,163,190 | 7/1979 | Moerman .................................. 323/6 |
| 4,167,037 | 9/1979 | Moerman .............................. 363/79 |
| 4,251,736 | 2/1981 | Coleman ............................ 307/66 X |
| 4,513,240 | 4/1985 | Putman ................................ 323/210 |

*Primary Examiner*—A. D. Pellinen
*Assistant Examiner*—Todd DeBoer
*Attorney, Agent, or Firm*—Schwartz, Jeffery, Schwaab, Mack, Blumenthal & Evans

[57] ABSTRACT

A method and a system for interconnecting two electrical, alternating three phase networks operating asynchronously or synchronously at voltages of equal or adjacent frequencies, and in which, for corresponding phases, the voltages of the first and second networks are out of phase by a constant or varying angle. A plurality of three phase variable reactive impedances interconnect the two networks for carrying out a desired transfer of active power from one of the two networks to the other. The variable impedances are operated to establish between each phase of the first network and the three phases of the second network, three interconnections each having a different susceptance, which susceptances vary with the three phase variable reactive impedances. A regulator measures electrical parameters associated with at least one corresponding phase of the first and second networks, and operates the three phase variable reactive impedances to vary the susceptances of the interconnections in relation with the measured parameters so as to establish the desired transfer of active power from one of the first and second networks to the other network, while maintaining at a desired level a reactive power engaged in the transfer of active power.

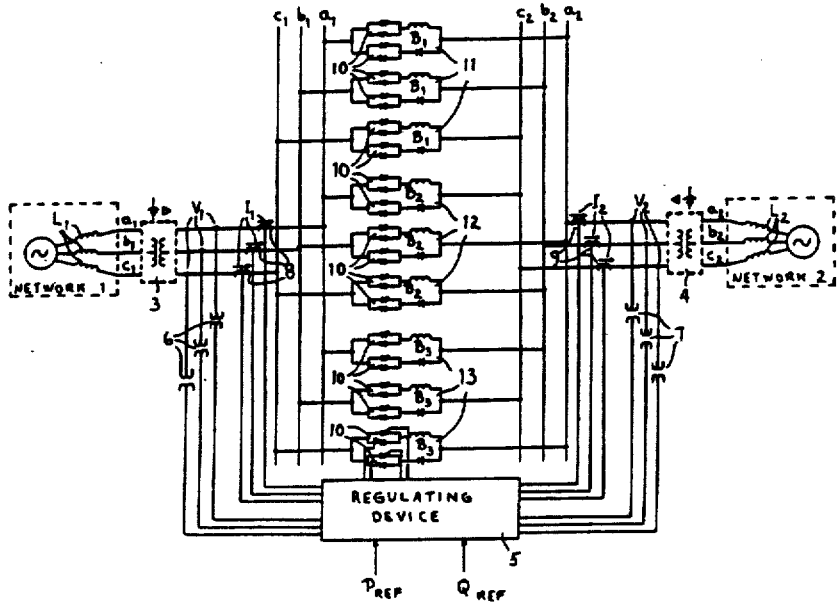

37 Claims, 5 Drawing Figures